(12) United States Patent
Fang

(10) Patent No.: US 6,995,718 B2
(45) Date of Patent: Feb. 7, 2006

(54) COMPUTER WITH AN EMBEDDED ANTENNA

(75) Inventor: Chien-Hsing Fang, Da-li (TW)

(73) Assignee: Wistron NeWeb Corp., Taipei Hsien (TW)

( * ) Notice: Subject to any disclaimer, the term of this patent is extended or adjusted under 35 U.S.C. 154(b) by 9 days.

(21) Appl. No.: 10/812,112

(22) Filed: Mar. 29, 2004

(65) Prior Publication Data

US 2004/0217904 A1    Nov. 4, 2004

Related U.S. Application Data

(63) Continuation of application No. 10/087,839, filed on Mar. 5, 2002, now Pat. No. 6,724,348.

(30) Foreign Application Priority Data

May 17, 2001  (TW) ................................ 90111862 A

(51) Int. Cl.
*H01Q 1/24*  (2006.01)
(52) U.S. Cl. ...................................... 343/702; 343/846

(58) Field of Classification Search ................ 343/702, 343/700 MS, 846, 848
See application file for complete search history.

(56) References Cited

U.S. PATENT DOCUMENTS

| | | | |
|---|---|---|---|
| 6,339,400 B1 * | 1/2002 | Flint et al. ................... | 343/702 |
| 6,388,627 B1 * | 5/2002 | Masaki et al. ............... | 343/702 |
| 6,414,643 B2 * | 7/2002 | Cheng et al. ................ | 343/702 |

* cited by examiner

*Primary Examiner*—Hoang V. Nguyen
(74) *Attorney, Agent, or Firm*—Quintero Law Office

(57) ABSTRACT

A laptop computer with an embedded antenna is disclosed. The laptop computer contains an LCD panel and an antenna embedded inside the LCD panel. The antenna is embedded in the gap between the covering of the LCD panel and the frame supporting the LCD on the LCD panel. The ground surface of the antenna is effectively extended through incorporating the conducting surface on the back of the LCD. When the LCD panel is opened the antenna is at a distance above the operating surface of the laptop computer and produces omni-directional radiation pattern in the horizontal plane.

11 Claims, 5 Drawing Sheets

COMPUTER WITH AN EMBEDDED ANTENNA

This application is a continuation of U.S. application Ser. No. 10/087,839, filed Mar. 5, 2002, now U.S. Pat. No. 6,724,348.

BACKGROUND OF THE INVENTION

1. Field of Invention

The invention relates to a computer with an embedded antenna wherein the gap between an LCD panel covering and an LCD frame is used to accommodate the antenna. In particular, by coupling the ground surface of the antenna to the shielding plate of the LCD panel, the ground surface and bandwidth of the antenna are extended.

2. Related Art

Wireless transmission devices are equipped with antennas for receiving and transmitting wireless signals. Some use a planar inverted-F antenna (PIFA) for such wireless transmission and reception. Such antennas are often embedded inside the housing of these wireless transmission devices. When a laptop computer with an embedded antenna, for example, is placed on a desk there may cause electromagnetic interference to the antenna due to other nearby facilities on the desk. This situation is bad for signal transmissions and receptions of the embedded antenna. Furthermore, since the antenna is inside the laptop computer housing, it also experiences interference from surrounding metallic conductors inside the housing. Therefore, signal receptions and transmissions are not ideal for an embedded antenna inside a laptop computer housing.

SUMMARY OF THE INVENTION

In considering the location of an embedded antenna in a laptop computer, some space out of the LCD panel of the laptop computer can be made use of for accommodating the antenna to achieve better transmission effects. However, as the LCD size increases, the space available in the LCD panel becomes limited, increasing the difficulty in the antenna design. The disclosed laptop computer with an embedded antenna uses the limited space still available in the LCD panel so as to overcome the problems encountered in the prior art. The antenna of the present invention is a metallic plate formed along the side of the LCD frame, using the limited space between the LCD frame and the panel cover to achieve high antenna performance for a compact laptop computer.

The present invention discloses a laptop computer with an LCD panel cover and an antenna embedded inside the LCD panel cover. The antenna is embedded in the gap between the panel cover and the LCD frame supporting the LCD panel. A shielding plate is included in the frame at the back surface of the LCD panel and the ground surface of the antenna can be extended by incorporating the shielding plate of the LCD frame, such that when the LCD panel is opened the antenna is at a distance above the keyboard of the laptop computer and thereby produces an omni-directional radiation pattern. Therefore, the embedded antenna of the present invention can achieve better wireless transmission quality under normal operating conditions of the laptop computer.

BRIEF DESCRIPTION OF THE DRAWINGS

The present invention will become more fully understood from the detailed description given hereinbelow, wherein.

DETAILED DESCRIPTION OF THE INVENTION

Figure 1:
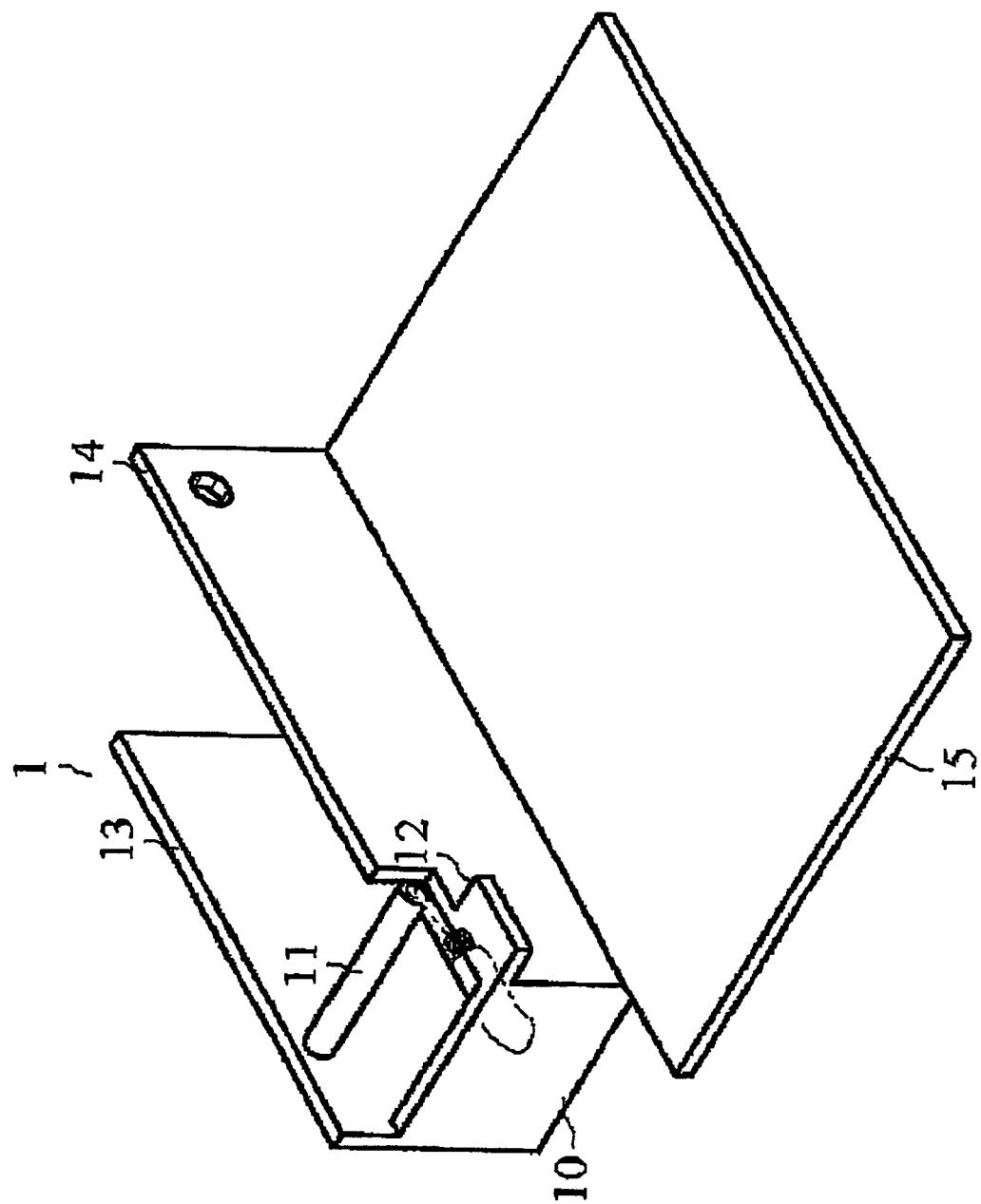
FIG. 1 is a perspective view of the disclosed inverted-F antenna.

Referring to FIG. 1, the inverted-F antenna 1 mainly includes a ground surface 14 and a radiation element 13 spaced apart from the ground surface 14 and connected to it by a short-circuit element 10. The radiation element 13 comprises a feed 11 for feeding signals and the ground surface 14 comprises a grounding section 12 for providing connection to, say, a coaxial cable. In addition, the inverted-F antenna 1 also includes a extended ground surface 15 that connects to the ground surface 14 and is bent to subtend an angle with the ground surface 14. The extended ground surface 15 provides a better grounding effect for the inverted-F antenna 1.

Figure 2:
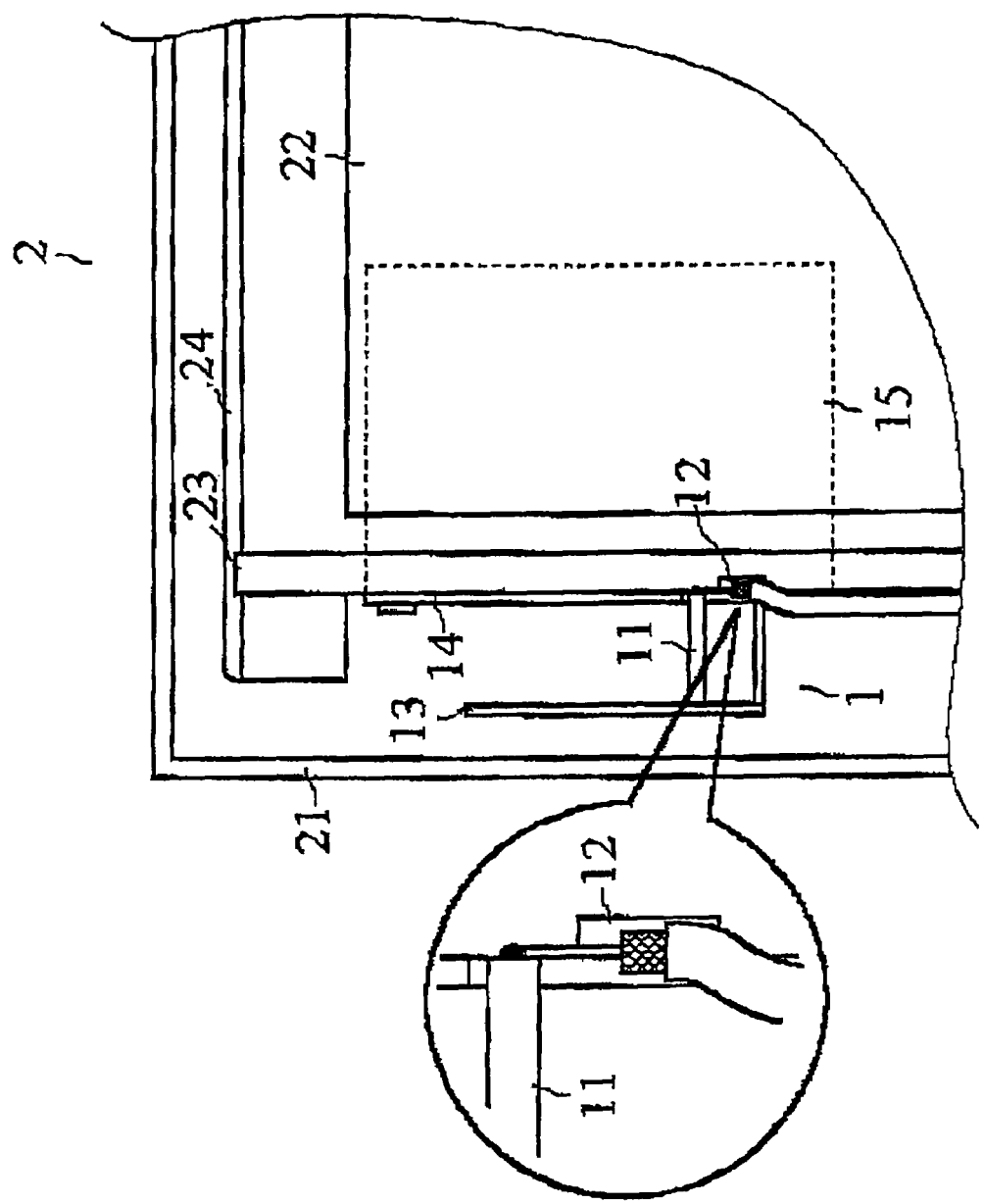
FIG. 2 is a front view of a first embodiment of the invention.
Figure 3:
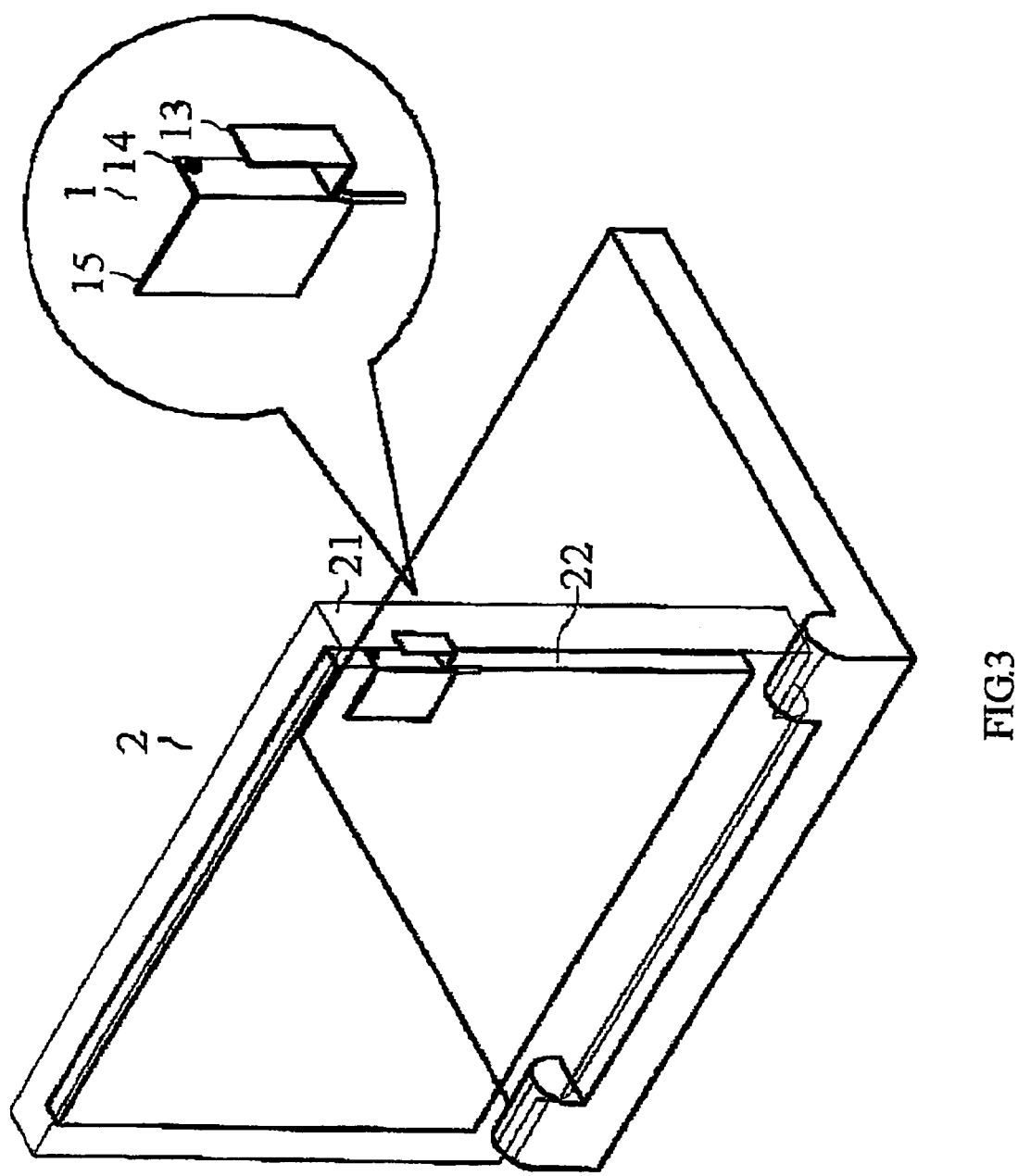
FIG. 3 is a perspective view of the structure in FIG. 2.

With reference to FIGS. 2 and 3, the laptop computer 2 includes an LCD panel having a cover 21, an LCD 22 covered and protected by the cover 21, a frame 23 that securely supports the LCD 22 on the cover 21, and a back shielding plate 24 on the back side of the LCD 22 for shielding purposes. The laptop computer 2 has an inverted-F antenna 1 accommodated into the gap between the cover 21 and the frame 23. The width of the radiation element 13 and the ground surface 14 can be the same as or smaller then that of the LCD 22. The ground surface 14 can be fixed onto the frame 23 by screws. The extended ground surface 15 of the inverted-F antenna 1 is preferably formed integrally with, and perpendicularly connected to, the ground surface 14 so that, when antenna 1 is attached to the frame 23 at an edge of the LCD 22, the extended ground surface 15 is on the back side of the LCD 22 and is stalked or fixed onto the back surface of the LCD 22. In this way, the antenna can be easily accommodated into the narrow space available in the LCD panel.

Figure 4:
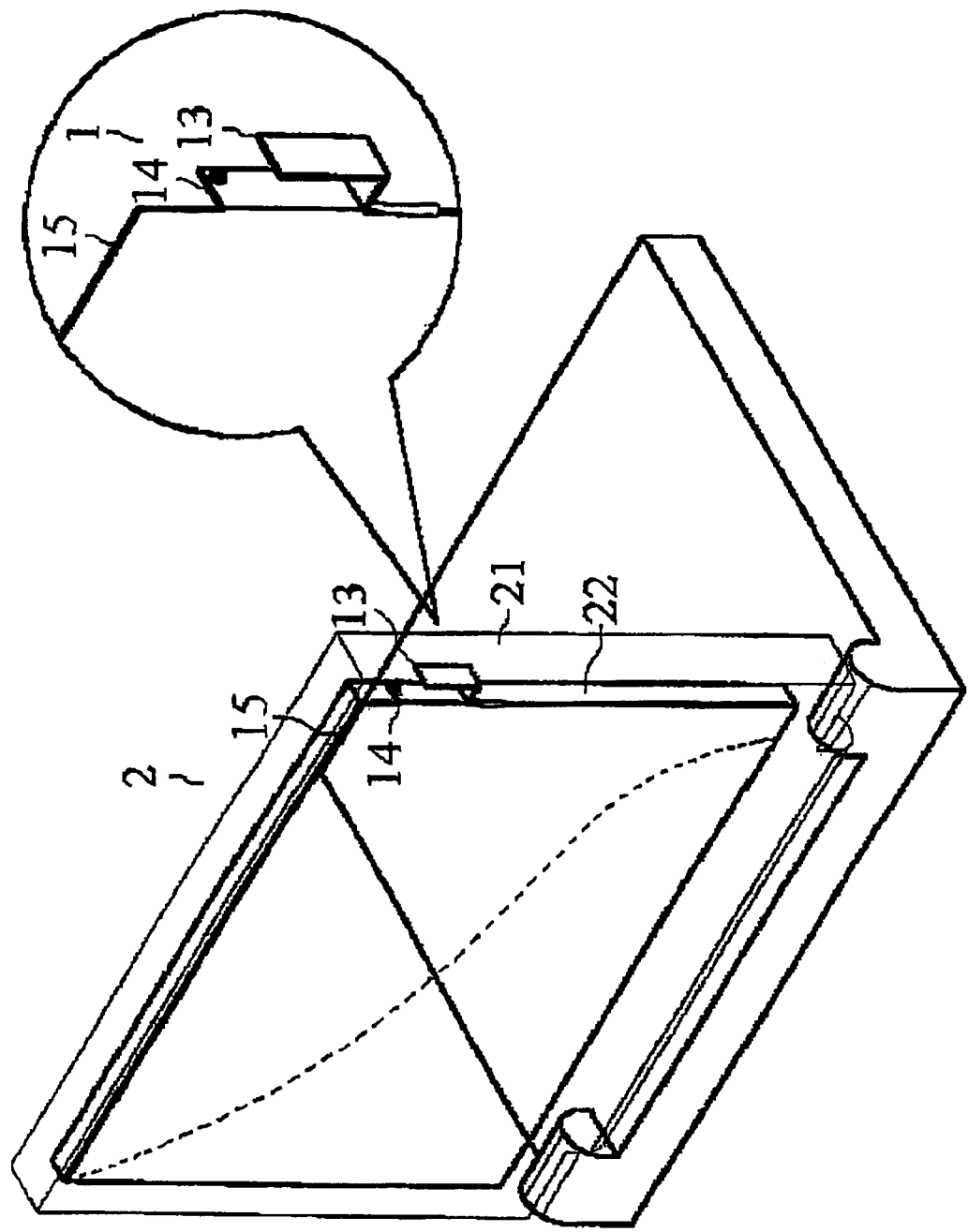
FIG. 4 is a perspective view of a second embodiment of the invention.

As shown in FIG. 4, the shape of the extended ground surface 15 in the present invention is not limited to be triangular. In accordance with practical needs and space of the wireless transmission device available, the extended ground surface 15 can be made into the shape indicated by the dashed curve in the drawing or any other desired curve so that improvement to the antenna, e.g. an increase in bandwidth, can be obtained. Within allowed space, the area of the extended ground surface 15 can be made larger to improve antenna characteristics. In accordance with the present invention, the extended ground surface 15 can be extended to cover the whole LCD back surface, thereby replacing the original back shielding plate 24 for the LCD 22. Particularly, the shielding/ground surface 15 and the antenna 1 can be formed integrally as a monolithic structure. This configuration can effectively utilize the extended ground surface to increase the efficiency of the antenna.

Figure 5:
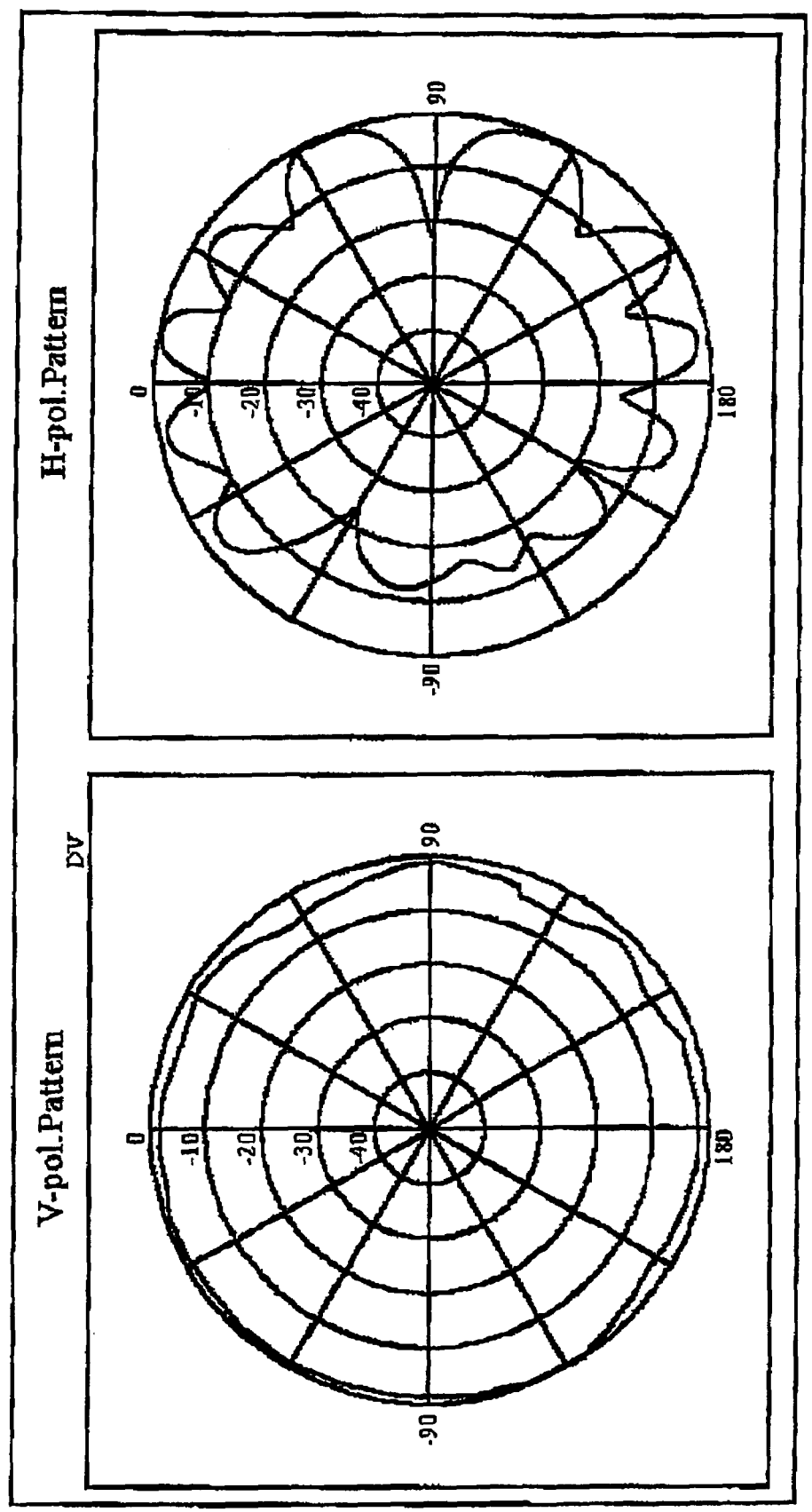
FIG. 5 shows a radiation waveform generated from the embedded antenna installed along the side of the LCD.

As shown in FIG. 5 the radiation diagram illustrates the property of the radiation pattern of the embedded antenna 1 in the azimuth or horizontal plane of the laptop computer 2 when the LCD 22 is open in an upright position according to ordinary usage. The horizontal component of the antenna polarization is shown on the right plot while the vertical component on the left. The vertical polarization component is almost uniform in each direction. This indicates that the embedded antenna in accordance with the present invention can achieve omni-directional radiation on the horizontal plane. This is a good property for wireless communications. Moreover, the disclosed extended ground surface helps fine-tune the input impedance of the antenna, in addition to the benefit of increasing the bandwidth, in an embodiment of the invention, for an input impedance of 50 Ohm, the dimension of the extended ground surface is 20×40 mm² and the bandwidth is increased by 40 MHz from 110 MHz to 150 MHz.

The antenna structure according to the present invention is suitable for embedding into narrowing space still utilizable within a laptop LCD panel, but its utility is not limited to rotatable LCD panel and laptop computers. As is easily recognized by persons with skills in the art, the concept of the present invention can be applied to any display device of flat panel structure contained in any computer system other than a laptop, such as tablets and other information appliances.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A portable electronic device, comprising:
   a display unit for displaying information;
   a cover for housing said display unit;
   a supporting structure for supporting said display unit on said cover; and
   an antenna having a radiation element, a first grounding element and a second grounding element, wherein said first grounding element subtends an angle with said second grounding element and said first grounding element is attached to said supporting structure at an edge of said display unit, wherein said radiation element is disposed on a first side of said first ground element, and said second grounding element is disposed on a second side of said first grounding element.

2. The portable electronic device of claim 1, wherein said portable electronic device further comprises a computing unit rotatably connected to said cover.

3. The portable electronic device of claim 1, further comprising a back shielding plate disposed between said cover and said display unit.

4. The portable electronic device of claim 3, wherein said second grounding element is disposed between said display unit and said back shielding plate.

5. The portable electronic device of claim 1, wherein said first grounding element and said second grounding element form a monolithic structure.

6. A portable electronic device, comprising:
   a display unit for displaying information;
   a cover for housing said display unit;
   a supporting structure for supporting said display unit on said cover;
   an antenna having a radiation element and a first grounding element, wherein the first grounding element is attached to said supporting structure at an edge of said display unit; and
   a fastening element for fixing said antenna on said supporting structure, wherein said first grounding element comprises a hole to engage with said fastening element.

7. The portable electronic device of claim 6, wherein said portable electronic device further comprises a computing unit rotatably connected to said cover.

8. The portable electronic device of claim 6, wherein said supporting structure further comprises a hole to engage with said fastening element.

9. The portable electronic device of claim 6, further comprising a second grounding element integrated with said first grounding element.

10. The portable electronic device of claim 9, further comprising a fastening element for fixing said antenna on said supporting structure.

11. The portable electronic device of claim 10, wherein said first grounding element further comprises a hole to engage with said fastening element.

* * * * *